United States Patent Office 3,300,413
Patented Jan. 24, 1967

3,300,413
SURFACE ACTIVE COMPOSITIONS CONTAINING MIXTURES OF MONO- AND DI-ALKYLOXY-METHYL ETHERS OF SUGAR
Geoffrey R. Ames, Redhull, Surrey, England, assignor to the United States of America as represented by the Secretary of Agriculture
No Drawing. Original application Aug. 14, 1963, Ser. No. 302,218. Divided and this application July 12, 1965, Ser. No. 482,317
2 Claims. (Cl. 252—351)

This application is a division of copending application, Serial No. 302,218 filed Aug. 14, 1963.

An irrevocable, nontransferable, royalty-free license to practice the invention herein described, throughout the world, is hereby granted to the Government of the United States of America.

This invention concerns the preparation of ethers of organic polyhydroxy compounds. The objects of the invention include the provision of new compounds and compositions and novel methods of preparing them. Further objects of the invention will be evident from the following description wherein parts and percentages are by weight unless otherwise specified.

In prior techniques ethers of polyhydroxy compounds are prepared by reacting a sodium derivative of the polyhydroxy compound, e.g., sodium sucrate, with an appropriate alkylating agent such as an alkyl chloride. This procedure has the disadvantage that it requires preparation of the intermediate sodium derivative. The process of the invention has the advantage that the polyhydroxy compounds are directly converted into ethers. This is accomplished, in accordance with the invention, by contacting a solution of the polyhydroxy compound in a non-aqueous solvent with an α-halogen-substituted ether. Thus, in a typical embodiment of the invention, a solution of glucose in dimethylformamide is reacted with butyl chloromethyl ether to produce directly a butoxymethyl ether of glucose.

In addition to its ability to yield ethers directly, the process of the invention has the advantages that it can be carried out at ordinary (room) temperature and that no catalyst is required to obtain a fast reaction rate. As will be shown hereinafter, yields as high as 75% may be attained with reaction times of a few minutes at room temperature. Another point is that the reaction can be readily controlled to obtain a desired degree of etherification, that is, the conditions of reaction and/or etherifying agent used can be adjusted to prepare mono-, di-, tri- or higher polyethers as desired.

The process of the invention is of wide versatility and may be employed to prepare ethers from all types of polyhydroxy compounds. Typical examples of polyhydroxy compounds to which the invention may be applied are polyols such as ethylene glycol, glycerol, sorbitol, mannitol, erythritol, pentaerythritol, dipentaerythritol, polyglycerol, dulcitol, inositol, polyethylene glycols, etc.; sugars such as glucose, sucrose, galactose, fructose, xylose, maltose, lactose, mannose, D- and L-arabinose, sorbose, ribose, cellobiose, raffinose, and rhammose; other carbohydrates and carbohydrate derivatives such as gluconolactone, diacetone glucose, glucuronolactone, octakis-2-hydroxypropyl-sucrose, and methyl glucoside. The invention finds its greatest field of utility in its application to saccharides—typified by the sugars—since these compounds are particularly difficult to convert into ethers by known procedures.

A critical item in the process of the invention is that the polyhydroxy compound is applied to the reaction in the form of a solution in a non-aqueous solvent. In general, one may use any organic liquid which has the ability to dissolve carbohydrates and which is inert, that is, which will not react with the polyhydroxy compound, the α-halogen-substituted ether, or with the ether product. Typical of the solvents which may be used are the dialkyl sulphoxides such as dimethyl sulphoxide and the completely substituted amides such as dimethylformamide, dimethylacetamide, N - formylpiperidine, and N-acetylmorpholine. It may be noted that solvents such as amides (or amines) which contain hydrogen attached to the nitrogen atom, or even tertiary amines, are not satisfactory as they are not inert. Thus, for example, pyridine is not inert as it appears to form a salt with the α-halogen-substituted ether, the formation of which salt interferes with the desired etherification. Water may be present in the non-aqueous solvent, but it is desirable that it should be absent since any water therein will tend to decompose the α-halogen-substituted ether so that a greater amount of the latter would have to be used to make up for the loss. For this reason it is preferred to employ the non-aqueous solvent in an essentially anhydrous condition. It is further to be noted that the types of solvents—the dialkyl sulphoxides and completely substituted amides which are preferred in carrying out the process of the invention—function not only as mere solvents but exhibit a reaction promoting or catalyzing action. Thus, by their use one is enabled not only to achieve etherification of saccharides but also to obtain high yiedls of the saccharide ether products with short reaction times. In general, dimethylformamide is particularly preferred as it provides especially rapid rates of esterification.

The etherifying agent used in accordance with the invention may be any α-halogen-substituted ether, by which terminology is meant an ether wherein the halogen is on a carbon atom adjacent to the ether linkage. The critical aspect of the etherifying agent is the presence of this halogen in the alpha position whereby it is in an activated state so that direct etherification of hydroxyl groups is possible; the remainder of the etherifying agent is of no moment and thus may be any hydrocarbon system such as aliphatic, cycloaliphatic, aromatic, or combinations thereof. It is thus obvious that the structure of the etherifying agent may be varied at will, depending on what type of end product is desired with the proviso that the critical α-halo configuration be retained. It is, of course, evident that the term "halogen" is employed herein in the conventional sense of excluding fluorine. Thus the halogen of the α-halogen-substituted ether may be iodine, bromine, or chlorine, the last two being preferred.

In the preferred embodiments of the invention, the etherifying agent is a compound of the structure

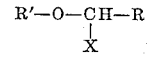

wherein:

R is hydrogen; an alkyl group which may be straight or branched chain, e.g., methyl, ethyl, propyl, isopropyl, butyl, etc.; and aryl group such as phenyl, tolyl, xylyl, etc.; or an aralkyl group such as benzyl.

R′ is an alkyl group which may be straight chain or branched chain, e.g., alkyl radicals containing one to twenty-two or more carbon atoms; an alkenyl radical such as crotyl (but-2-enyl), oleyl (octadec-9-enyl), etc.; a cycloalkyl radical such as cyclohexyl or cholesteryl; or an aralkyl group such as benzyl, methylbenzyl, dimethylbenzyl, and the like.

X is chlorine, bromine, or iodine.

Particularly preferred for the purpose of the invention is the use, as the etherifying agent, of α-haloalkyl ethers, i.e., ethers containing an aliphatic hydrocarbon structure with a halogen atom (preferably chlorine or bromine) on the carbon atom of this structure adjacent to the ether linkage. Coming into special consideration are such compounds selected from the category of chloromethyl ethers, α-chloroethyl ethers, bromomethyl ethers, and α-bromoethyl ethers. Typical examples of specific compounds which may be employed for the purpose of the invention are ethyl chloromethyl ether, butyl chloromethyl ether, hexyl chloromethyl ether, octyl chloromethyl ether, decyl chloromethyl ether, dodecyl chloromethyl ether, tetradecyl chloromethyl ether, hexadecyl chloromethyl ether, octadecyl chloromethyl ether, cyclohexyl chloromethyl ether, cholesteryl chloromethyl ether, benzyl chloromethyl ether, crotyl chloromethyl ether, oleyl chloromethyl ether, ethyl α-chloroethyl ether, butyl α-chloroethyl ether, hexyl α-chloroethyl ether, octyl α-chloroethyl ether, decyl α-chloroethyl ether, dodecyl α-chloroethyl ether, tetradecyl α-chloroethyl ether, hexadecyl α-chloroethyl ether, octadecyl α-chloroethyl ether, cyclohexyl α-chloroethyl ether, benzyl α-chloroethyl ether, ethyl α-chlorobutyl ether, butyl α-chlorobutyl ether, hexyl α-chlorobutyl ether, ethyl α-chlorohexyl ether, butyl α-chlorohexyl ether, hexyl α-chlorohexyl ether, ethyl α-chlorododecyl ether, ethyl α-chlorobenzyl ether, cyclohexyl α-chlorobutyl ether, butyl bromomethyl ether, and chloromethyl—or α-chloroethyl ethers of polyhydroxy compounds, for instance, the chloromethyl ethers of ethylene glycol, glycerol, pentaerythritol, glucose, sucrose, or other sugars.

The degree of etherification attained may be varied by adjustment of such factors as the proportion of reactants, the time of reaction, and the type of etherification agent selected. For example, by using a molecular excess of α-halogen-substituted ether, the etherification of more than one hydroxyl group is favored. Conversely, if it is desired to produce a mono-ether, the polyhydroxy compound is used in equimolar proportion or in molecular excess. With regard to reaction time, it is obvious that a longer reaction time will favor a greater degree of etherification. It has also been observed that greater degrees of etherification can be attained by using an α-bromoalkyl ether rather than an α-chloroalkyl ether as the etherifying agent. For example, with agents such as ethyl and butyl chloromethyl ethers it is possible to etherify only three to four of the possible five hydroxy groups of glucose. However, by the use of butyl bromomethyl ether, all five hydroxyl groups can be etherified. A similar situation exists in the case of sucrose. For example, with chloromethyl ether reagents only five to six hydroxyl groups of sucrose can be etherified whereas with bromomethyl ethers one can etherify seven of the possible eight hydroxy groups.

The reaction in accordance with the invention may conveniently be carried out at room temperature (about 20° C.). Satisfactory results are obtained, however, when the reaction temperature is below the ambient; for example, the reaction may be carried out at minus 5° C., or even at minus 10° C. although the reaction will proceed more slowly under such conditions. At elevated temperatures, the reaction proceeds more rapidly, temperatures up to about 50° C. being suitable. At temperatures substantially above 50° C., however, the product may become discolored due to side reactions of the polyhydroxy compound with the liberated hydrogen halide.

In order to separate the product from the reaction medium, the mixture may be poured into water and selective organic solvent for the product, e.g., ethyl acetate, ether, or benzene. The organic layer is then removed, dried, and the solvent evaporated to leave the ether product.

It is obvious that if the aim is to produce products of a high degree of etherification, the products from a first reaction but still containing free hydroxy groups may be again reacted in accordance with the invention to obtain further etherification.

The ethers which are prepared in accordance with the invention have many uses. In general, they are useful as plasticizers, surface-active agents, and as intermediates in chemical syntheses. The products which are etherified to a large degree are water-insoluble, organic-solvent-soluble liquids which are stable and can be used in plasticizing resins, plastics, and waxes, for example, the cellulose ethers, beeswax, paraffin wax, etc. Typical of such liquids are glucose tri(butoxymethyl) ether, glucose tetra(ethoxymethyl) ether, sucrose penta(butoxymethyl) ether, sucrose penta(n-octyloxymethyl) ether, and sucrose penta(sec-octyloxymethyl) ether. The products which are etherified to a small degree and particularly those wherein the ether group provides the proper hydrophobic balance against the hydrophilic remainder of the compound, possess surface-active properties and can be employed in all the usual applications of surface-active agents. Typical of such uses are emulsifying oily materials with aqueous systems, emulsifying air into liquid systems to prepare stable foams, washing of textiles or other detergent applications. Compounds useful for such purposes are, for example, the mono- and di-(alkoxymethyl) ethers of glucose and sucrose wherein the alkyl group is of long chain length, for example, 8 to 16 carbon atoms. Particularly valuable as detergents are the mixtures of the aforesaid types of mono- and di-ethers since they are more effective than either the mono-ether or the di-ether separately and are, indeed, at least as effective as conventional detergents such as the alkyl aryl sulphonates.

The invention is further demonstrated by the following illustrative examples.

*Example 1*

A series of runs were carried out in which glucose and butyl chloromethyl ether were reacted under varying conditions of time and temperature. In each case the following procedure was used:

Eight grams of butyl chloromethyl ether (6 moles) were mixed with 2 g. (1 mole) of glucose in 75 ml. dry dimethylformamide. The mixture was held at a temperature and for a time as specified hereinbelow. The reaction mixture was then poured into a mixture of water (200 ml.) and ethyl acetate (200 ml.). The organic solvent phase was removed, dried, and the product obtained by evaporating off the solvent.

In this way there was prepared:

Run *a*: Glucose di-(butoxymethyl) ether.
Run *b*: A mixture of glucose di- and tri-(butoxymethyl) ether.
Runs *c* and *d*: Glucose tri-(butoxymethyl) ether.

All of these products were essentially colorless, syrupy liquids, insoluble in water but soluble in all common organic solvents.

The reaction (Run *a*) may be illustrated by the following equation:

$(C_6H_7O)(OH)_5 + 2Cl-CH_2OC_4H_9 \longrightarrow$
glucose    butyl chloromethyl ether

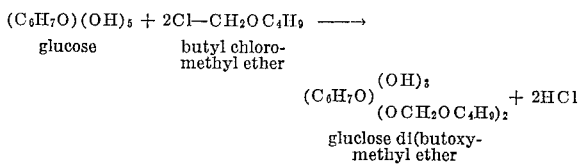

glucose di(butoxymethyl ether

The conditions used in the various runs and the results of analyses of the products are tabulated below:

TABLE I.—REACTION OF GLUCOSE WITH BUTYL CHLOROMETHYL ETHER

| Run | Reaction temp., °C. | Reaction time, min. | Yield, percent | $\alpha_D$, deg. | $n_D^{25}$ | Analysis, percent | | | | | Structure |
|---|---|---|---|---|---|---|---|---|---|---|---|
| | | | | | | C | H | O | CH$_2$O | C$_4$H$_9$OCH$_2$ | |
| a | 20 | 5 | 75 | +23 | 1.4662 | 54.9 | 9.3 | 36.2 | 16 | 49 | Glucose di-(butoxymethyl) ether. |
| b | 20 | 60 | 80 | | 1.4575 | 56.8 | 9.7 | | 20 | 56 | Mixture of glucose di- and tri- (butoxymethyl) ether, mostly latter. |
| c | 20 | 240 | 85 | +20 | 1.4595 | 57.5 | 9.7 | 32.9 | 21 | 59 | Glucose tri-(butoxymethyl) ether. |
| d | 50 | 30 | 65 | +20 | 1.4586 | 57.7 | 9.5 | 32.5 | 21 | 58 | Do. |

*Example II*

A series of runs were carried out in which glucose was reacted with various halomethyl ethers. The procedure was as described in Example I, employing in each case a proportion of six moles of halomethyl ether to one mole of glucose. In each case the reaction temperature was 20° C.

TABLE II.—REACTION OF GLUCOSE WITH VARIOUS HALOMETHYL ETHERS REACTION TEMPERATURE, 20° C.

| Run | Ether used | Reaction time, hrs. | Yield, Percent | $\alpha_D$, deg. | $n_D^{25}$ | Analysis, Percent | | Structure |
|---|---|---|---|---|---|---|---|---|
| | | | | | | C | H | |
| a | Ethyl chloromethyl | 3 | | +25 | 1.4549 | 51.5 | 8.7 | Mixture of glucose tri- and tetra-(ethoxymethyl) ether, mostly latter. |
| b | do | 20 | 96 | +37 | 1.4494 | 52.2 | 8.8 | Glucose tetra-(ethoxymethyl) ether. |
| c | Butyl bromomethyl | 0.1 | 98 | +30 | 1.4495 | 59.5 | 10.1 | Glucose tetra-(butoxymethyl) ether. |
| d | do | 1 | 87 | +30 | 1.4479 | 60.6 | 10.2 | Glucose penta-(butoxymethyl) ether. |
| e | n-Hexyl chloromethyl | 3 | 88 | +16 | 1.4570 | 61.8 | 10.3 | Glucose tri-(n-hexoxymethyl) ether. |
| f | n-Octyl chloromethyl | 3 | 98 | +13 | 1.4555 | 65.8 | 11.2 | Glucose tri-(n-octoxymethyl) ether. |
| g | sec-Octyl chloromethyl | 3 | 94 | +15 | 1.4546 | 65.0 | 11.2 | Glucose tri-(sec-octoxymethyl) ether. |

*Example III*

A series of runs were carried out in which sucrose was reacted with various halomethyl ethers. The procedure in each case was as follows:

Two grams of sucrose were dissolved in 75 ml. of dry dimethylformamide. To this solution was added the amount of halomethyl ether required to provide eight moles thereof per mole of sucrose. The mixture was held at 20° C. for the time specified below. The reaction mixture was then poured into a mixture of water (200 ml.) and ethyl acetate (200 ml.). The organic phase was removed, dried, and the product obtained by evaporating off the solvent.

The results obtained are tabulated below:

TABLE III.—REACTION OF SUCROSE WITH HALOMETHYL ALKYL ETHERS

| Run | Ether used | Reaction time, hrs. | Yield, percent | $\alpha_D$, deg. | $n_D^{25}$ | Analysis, weight percent | | | | Structure |
|---|---|---|---|---|---|---|---|---|---|---|
| | | | | | | C | H | CH$_2$O | C$_4$H$_9$OCH | |
| a | Butyl chloromethyl | 1 | 82 | +30 | 1.4618 | 57.2 | 9.3 | 17 | 56 | Sucrose penta-(butoxymethyl) ether. |
| b | do | 20 | 82 | +34 | 1.4594 | 57.6 | 9.7 | 19 | 57 | Do. |
| c | n-Octyl chloromethyl | 3 | 95 | +21 | 1.4624 | 64.9 | 10.7 | 13 | | Sucrose penta-(n-octyloxymethyl) ether. |
| d | sec-Octyl chloromethyl | 3 | 100 | | 1.4593 | 65.35 | 10.86 | | | Sucrose penta-(sec-octyloxymethyl) ether. |
| e | Ethyl chloromethyl | 3 | 93 | +45 | 1.4588 | 51.3 | 8.3 | | | Mixture of sucrose penta- and hexa-(ethoxymethyl) ether, mostly latter. |
| f | do | 18 | 98 | +50 | 1.4549 | 52.2 | 8.7 | | | Sucrose hexa-(ethoxymethyl) ether. |
| g | Butyl bromomethyl | 3 | 98 | +47 | 1.4541 | 59.7 | 9.9 | | | Sucrose hepta-(butoxymethyl) ether. |

Example IV-A

A series of mono-alkoxymethyl ethers of sucrose were prepared by reacting sucrose with the following ethers—n-hexyl chloromethyl ether, n-octyl chloromethyl ether, n-decyl chloromethyl ether, n-dodecyl chloromethyl ether, n-hexadecyl chloromethyl ether, and n-oleyl chloromethyl ether, using the typical procedure described below.

A solution of sucrose (60 g.) in dimethylformamide (1.5 l.) was cooled in ice and stirred while octyl chloromethyl ether (17 g.) in dimethylformamide (50 ml.) was added dropwise. The addition was completed in about fifteen minutes. After a further fifteen minutes, the mixture was poured into a mixture of water (4 l.), ethyl acetate (3.2 l.), and butanol (0.8 l.). The product was isolated from the organic phase by drying and evaporation.

The products obtained in this way contained only small proportions of the di-ethers, although the longer chain alkyl chloromethyl ethers gave a greater proportion of di-ether. The various products are described in the following table:

TABLE IV-A1.—MONO-ALKYLOXYMETHYL ETHERS OF SUCROSE

| Alkyl group | Properties and composition of product | | |
|---|---|---|---|
| | $\alpha_D$, deg. | Analysis, percent | Composition, percent of monoether |
| | | C | H | |
| n-Hexyl | +40 | 51.4 | 8.6 | 70 |
| n-Octyl | +36 | 52.9 | 8.9 | 86 |
| n-Decyl | +33 | 55.5 | 9.4 | 72 |
| n-Dodecyl | +30 | 55.9 | 9.2 | 94 |
| n-Hexadecyl | +24 | 62.8 | 10.5 | 32 |
| Oleyl | | 64.7 | 10.5 | 27 |

The surface properties of the products are shown in Table IV-A2. Surface and interfacial tension measurements were made, using a du Nuoy balance. Draves-Clarkson wetting times were determined by Ashworth and Lloyd's modification (J. Sci. Fd. Agric., 1961, 12, 234). Ross-Miles foam heights were measured as described by Harris, "Detergency Evaluation and Testing," Interscience, New York, 1954, p. 47. The various tests were conducted on aqueous solutions containing 0.1% or 0.01% of the sucrose alkyloxymethyl ethers.

TABLE IV-A2.—SURFACE-ACTIVE PROPERTIES OF MONO-ALKYLOXYMETHYL ETHERS OF SUCROSE

| Alkyl group | Surface tension, dynes/cm. | | Interfacial tension (dynes/cm.), 0.1% | Draves-Clarkson wetting time (sec.) | | Ross-Miles foam height (cm.), 0.1% | | |
|---|---|---|---|---|---|---|---|---|
| | 0.1% | 0.01% | | 0.1% | 0.01% | 0 | 5 min. | 10 min. |
| n-Hexyl | | 39.4 | | | 300 | | | |
| n-Octyl | 27.3 | 28.3 | 2.0 | 28 | 135 | 6 | 5.5 | 5 |
| n-Decyl | 27.9 | 28.6 | 2.4 | 26 | 150 | 3 | 2.5 | 2 |
| n-Dodecyl | 32.0 | 33.6 | 7.4 | 150 | 390 | 1.5 | 1 | 1 |

Example IV-B

Equimolecular proportions of sucrose and various alkyl chloromethyl ethers (i.e., n-hexyl-, n-octyl-, n-decyl-, and n-dodecyl-chloromethyl ethers) were reacted at room temperature. The products were mixtures of approximately equal proportions of the mono- and di-alkoxymethyl ethers. The procedure used is typified by the following description:

A solution of 15 grams of sucrose in 500 ml. of dimethylformamide was added to 10 grams of dodecyl chloromethyl ether. The resulting solution was left at room temperature for 30 minutes, then poured into a mixture of water (2 l.), ethyl acetate (1.6 l.), and butanol (400 ml.). The organic layer was washed with water, dried with sodium sulphate, and evaporated to give the product (18.7 g.).

The various products prepared in this manner are described below in Table IV-B1; their surface activity is shown in Table IV-B2.

TABLE IV-B1.—MIXED MONO- AND DI-ALKYLOXYMETHYL ETHERS OF SUCROSE

| Alkyl group | Properties and composition of product | | | |
|---|---|---|---|---|
| | $\alpha_D$, deg. | Analysis, percent | | Composition, percent of monoether |
| | | C | H | |
| n-Hexyl | +32 | 52.1 | 9.0 | 55 |
| n-Octyl | +39 | 54.7 | 9.3 | 51 |
| n-Decyl | +37 | 56.3 | 9.4 | 60 |
| n-Dodecyl | +32 | 58.8 | 9.1 | 47 |

TABLE IV-B2.—SURFACE ACTIVITY OF MIXED MONO- AND DI-ALKYLOXYMETHYL ETHERS OF SUCROSE

| Alkyl group | Surface tension, dynes/cm. | | Draves-Clarkson wetting time (sec.) | | Interfacial tension, dynes/cm. | | Ross-Miles foam height (cm.) 0.1% | | |
|---|---|---|---|---|---|---|---|---|---|
| | 0.1% | 0.01% | 0.1% | 0.01% | 0.1% | .01% | 0 | 5 min. | 10 min. |
| n-Hexyl | 26.2 | 28.8 | 22 | 210 | 2.7 | 6.0 | Trace | Trace | Trace |
| n-Octyl | 27.5 | 28.3 | 30 | 120 | 2.0 | 2.3 | 3 | 2 | 1.5 |
| n-Decyl | 29.5 | | 34 | | 2.5 | | 6.5 | 3 | 2.5 |
| n-Dodecyl | 29.1 | 31.2 | 33 | 150 | 4.6 | 8.5 | 3.5 | 3 | 2.5 |

Example IV-C

A series of mixed mono-and di-alkyloxymethyl ethers of glucose were prepared by the technique described above in Example IV-B. The products are described below:

TABLE IV-C.—MIXED MONO- AND DI-ALKYLOXYMETHYL ETHERS OF GLUCOSE

| Alkyl group | $\alpha_D$, deg. | Analysis, percent | | Composition (% of monoether) | Surface tension of 0.01% solution, dynes/cm. |
|---|---|---|---|---|---|
| | | C | H | | |
| n-Hexyl | +34 | 53.6 | 9.2 | 90 | 28.5 |
| n-Octyl | +29 | 56.0 | 9.6 | 100 | 28.5 |
| n-Decyl | +24 | 60.2 | 10.4 | 70 | 30.5 |
| n-Dodecyl | +20 | 62.4 | 10.5 | 70 | 31.6 |

Example V

A series of runs were carried out employing different solvents. In each case 2 grams of glucose dissolved in 75 ml. of the dry solvent were mixed with 7 grams of butyl chloromethyl ether. The mixture was allowed to stand 1 hour at room temperature, then poured into 200 ml. of water and 200 ml. of ethyl acetate. The organic phase was removed, dried, and the product recovered by evaporation of the solvent. The results are tabulated below:

roalkyl ethers, other than chloromethyl ethers, e.g., ethyl α-chloroethyl ether, butyl α-chloroethyl ether, octyl α-chloroethyl ether, etc. It was observed that in these runs the products were syrupy materials which resembled the corresponding alkoxymethyl ethers but whose composition suggested a mixture of the expected α-alkoxyethyl ether of the sugar and the α-alkoxyethyl ether of the ethylidene ether of the sugar. For example, when glucose is reacted with a 6 to 8 mole excess of butyl α-chloroethyl ether, the product apparently contains glucose α-butoxyethyl ether and the α-butoxyethyl ether of glucose ethylidene ether.

The products were prepared by the following typical procedure:

Two grams of sucrose were dissolved in 75 ml. dry dimethylformamide. To this solution was added the amount of α-chloroalkyl ether required to provide eight moles thereof per mole of sucrose. The mixture was held at 20° C. for the time specified below. Then, the reaction mixture was poured into a mixture of water (200 ml.) and ethyl acetate (200 ml.). The organic phase was removed, dried, and the product obtained by evaporating TABLE V.—REACTION OF GLUCOSE AND BUTYL CHLOROMETHYL ETHER IN PRESENCE OF VARIOUS SOLVENTS

| Solvent used | Yield, g. | $\alpha_D$, deg. | $n_D^{25}$ | Analysis, wt. percent | | Proportion of glucose tri-(butoxymethyl) ether in product, percent |
|---|---|---|---|---|---|---|
| | | | | C | H | |
| N-acetylmorpholine | 3.5 | +16 | 1.4613 | 55.66 | 9.45 | 40 |
| N-formylpiperidine | 2.0 | | 1.4650 | 55.78 | 9.26 | 40 |
| N,N-dimethylacetamide | 2.0 | +20 | 1.4630 | 55.49 | 9.53 | 30 |
| Dimethylsulphoxide | 2.0 | +26 | 1.4624 | 55.35 | 9.34 | 30 |
| Do* | 3.5 | | 1.4610 | 56.83 | 9.42 | 80 |

*In this case reaction time was 3 hours.

Example VI

Glucose and sucrose were reacted with various α-chloroalkyl ethers. The various products are described in the following table:

TABLE VI.—REACTION OF GLUCOSE AND SUCROSE WITH EXCESS ALKYL α-CHLOROALKYL ETHERS

| Sugar used | Ether used | Reaction time, hrs. | Properties and analysis of product | | | | | |
|---|---|---|---|---|---|---|---|---|
| | | | $\alpha_D$, deg. | $n_D^{25}$ | C, percent | H, percent | $CH_3CHO$, percent | $ROCH(CH_3)$— percent |
| Glucose | Ethyl α-chloroethyl | 3 | +21 | | 54.9 | 8.2 | 20.0 | 46 (R=$C_2H_5$—) |
| Do | do | 24 | +29 | | 54.9 | 8.3 | 23.4 | |
| Do | Butyl α-chloroethyl | 3 | +7 | 1.4611 | 57.0 | 8.5 | 21.7 | 42 (R=$C_4H_9$—) |
| Do | do | 20 | 0 | 1.4664 | 57.3 | 8.4 | 24.1 | 43 (R=$C_4H_9$—) |
| Do | Octyl α-chloroethyl | 3 | −2 | | 60.1 | 9.2 | | |
| Sucrose | Ethyl α-chloroethyl | 3 | +29 | | 54.9 | 8.3 | 17.5 | 49 (R=$C_2H_5$—) |
| Do | do | 24 | | | | | 18.8 | |
| Do | Butyl α-chloroethyl | 3 | +27 | | 56.6 | 8.4 | | |
| Do | do | 17 | +16 | | 54.4 | 8.1 | | |
| Glucose | Butyl α-chloropropyl | 3 | +29 | 1.4636 | 60.6 | 9.3 | | |
| Do | Butyl α-chlorobutyl | 3 | +15 | | 63.6 | 9.7 | | |
| Do | Butyl α-chloroheptyl | 3 | +3 | 1.4686 | 68.7 | 10.6 | | |
| Do | Butyl 1-chloro-2-ethylhexyl | 3 | | | 70.1 | 10.9 | | |

Having thus defined the invention, what is claimed is:
1. A surface-active composition consisting essentially of about equal parts by weight of:
   (I) a mono-(alkyloxymethyl) ether of a sugar and
   (II) a di-(alkyloxymethyl) ether of a sugar, wherein, in each of said constitutents I and II, the sugar is a member of the group consisting of sucrose and glucose and the alkyl groups contain 6 to 12 carbon atoms.
2. The composition of claim 1 wherein the sugar is sucrose.

References Cited by the Examiner

UNITED STATES PATENTS

| | | | |
|---|---|---|---|
| 2,974,134 | 3/1961 | Pollitzer | 252—351 |
| 3,048,577 | 7/1962 | Gaertner | 260—209 |
| 3,092,618 | 6/1963 | Rosen et al. | 260—209 |
| 3,170,915 | 2/1965 | Gaertner | 252—351 X |

LEON D. ROSDOL, *Primary Examiner.*

JULIUS GREENWALD, *Examiner.*

J. T. FEDIGAN, *Assistant Examiner.*